US011255784B2

(12) United States Patent
Greiner et al.

(10) Patent No.: US 11,255,784 B2
(45) Date of Patent: Feb. 22, 2022

(54) METHOD FOR DETERMINING THE CONCENTRATION OF A FLUORESCENT AND/OR FLUORESCENCE-LABELED ANALYTE, AND CALIBRATION METHOD FOR PREPARING SUCH DETERMINATION

(71) Applicant: Fraunhofer-Gesellschaft zur Förderung der angewandten Forschung e. V., Munich (DE)

(72) Inventors: Benjamin Greiner, Koenigswinter (DE); Lorenz Sparrenberg, Bonn (DE); Kristian Berwanger, Bonn (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 294 days.

(21) Appl. No.: 16/659,920

(22) Filed: Oct. 22, 2019

(65) Prior Publication Data
US 2020/0158643 A1 May 21, 2020

(30) Foreign Application Priority Data

Oct. 22, 2018 (DE) ...................... 10 2018 126 183.7

(51) Int. Cl.
*G01N 21/64* (2006.01)
(52) U.S. Cl.
CPC . *G01N 21/6428* (2013.01); *G01N 2021/6439* (2013.01); *G01N 2201/126* (2013.01); *G01N 2201/127* (2013.01)
(58) Field of Classification Search
CPC .............. G01N 21/64; G01N 21/6428; G01N 2021/6439; G01N 2201/126;
(Continued)

(56) References Cited

U.S. PATENT DOCUMENTS 4,889,690 A * 12/1989 Opitz .................... G01N 21/643
422/73
5,108,932 A * 4/1992 Wolfbeis ............ G01N 21/6428
436/124
(Continued)

FOREIGN PATENT DOCUMENTS

DE 10210737 3/2003
DE 60214561 5/2007
(Continued)

OTHER PUBLICATIONS

Kirner et al., "Single molecule detection for in vitro diagnostics", SPIE—International Society for Optical Engineering. Proceedings, vol. 6862, Feb. 7, 2008, San Jose, CA, pp. 1-10.
(Continued)

*Primary Examiner* — Tung S Lau
(74) *Attorney, Agent, or Firm* — Grossman, Tucker, Perreault & Pfleger, PLLC

(57) ABSTRACT

A method for determining the concentration of a fluorescent and/or fluorescence-labeled analyte, and to a calibration method for preparing such determination, for use in the field of biological and environmental analysis in order to improve the accuracy of concentration determination, comprising the following steps: performing fluorescence measurements for calibration samples that have predetermined concentrations of a plurality of fluorescent and/or fluorescence-labeled reference analytes $R_j$ that differ from each other by values m of a diffusion measure characterizing the diffusion of the reference analyte, in order to determine the values i of a concentration-dependent parameter I; establishing functions $F_j(c)=i$ which describe the dependence of the parameter I on the concentration; determining the values of a slope parameter a for the respective reference analyte as a derivative of the respective function at $c=0$; determining the values $m_j$ of the diffusion measure for the reference analytes; establishing
(Continued)

the dependence of the slope parameter a on the diffusion measure by a function $E(m)=a$; determining the value $a_{sample}$ specific to the analyte using the value $m_{sample}$ of the diffusion measure and the function $E(m)=a$; establishing an analyte-specific function $F_{sample}(c)=i$; performing fluorescence measurements for the analyte and determining the concentration of the analyte using the value i of the concentration-dependent parameter I and the inverse function $F^{-1}_{sample}(c)$.

24 Claims, 7 Drawing Sheets

(58) Field of Classification Search
CPC ........... G01N 2201/127; G01N 21/274; G01N 21/645; G01N 21/6408
See application file for complete search history.

(56) References Cited

U.S. PATENT DOCUMENTS

| | | | | |
|---|---|---|---|---|
| 5,518,694 | A * | 5/1996 | Bentsen | G01N 21/274 250/458.1 |
| 5,815,262 | A | 9/1998 | Schrof et al. | |
| 5,865,754 | A * | 2/1999 | Sevick-Muraca | G01N 21/6408 600/476 |
| 6,556,296 | B1 * | 4/2003 | Palo | G01N 21/6408 356/317 |
| 6,927,401 | B1 * | 8/2005 | Palo | G01J 3/4406 250/458.1 |
| 2002/0001768 | A1 * | 1/2002 | Feke | G03F 7/0045 430/139 |
| 2002/0008211 | A1 * | 1/2002 | Kask | G01N 21/64 250/459.1 |
| 2006/0146325 | A1 | 7/2006 | Wachsmuth et al. | |
| 2006/0262301 | A1 | 11/2006 | Watanabe et al. | |
| 2010/0140506 | A1 | 6/2010 | Eggeling et al. | |
| 2011/0226963 | A1 | 9/2011 | Knebel | |
| 2013/0287631 | A1 * | 10/2013 | Romey | A61B 5/14532 422/69 |

FOREIGN PATENT DOCUMENTS

| | | |
|---|---|---|
| DE | 102007033737 | 1/2009 |
| DE | 102010016818 | 9/2011 |
| EP | 1645881 | 4/2006 |
| EP | 1411345 | 9/2006 |
| EP | 1788379 | 5/2007 |

OTHER PUBLICATIONS

Schwille et al., "Dual-Color Fluorescent Cross-Correlation Spectroscopy for Multicomponent Diffusional Analysis in Solution", Biophysical Journal, Amsterdam, NL, vol. 72, No. 4, Apr. 1997, pp. 1878-1886.
European Search report from related EPO Appln. No. 19204343, dated Mar. 23, 2020.

* cited by examiner

METHOD FOR DETERMINING THE CONCENTRATION OF A FLUORESCENT AND/OR FLUORESCENCE-LABELED ANALYTE, AND CALIBRATION METHOD FOR PREPARING SUCH DETERMINATION

FIELD

The invention relates to a method for determining the concentration of a fluorescent and/or fluorescence-labeled analyte and to a calibration method for preparing the determination of the concentration of a fluorescent and/or fluorescence-labeled analyte.

BACKGROUND

Quantitative analysis is particularly relevant for life sciences, forensics, and environmental analysis. For this purpose, the number or mass of particles of an analyte in a volume and/or in a unit mass are determined. A determination of DNA concentration is performed, for example, during sample preparation for Next Generation Sequencing.

Methods for determining the concentration of analytes based on fluorescence measurements have been known. Fluorescence measurements are understood to be techniques in which fluorescence or photons emitted by a sample are detected quantitatively. Fluorescence measurements can be used for quantification or quantitative analysis of fluorescent and/or fluorescence-labeled analytes, in which the mass concentration and/or molar concentration of the analyte is determined quantitatively.

Fluorescent and fluorescence-labeled analytes include fluorophores. A fluorophore is a molecule or part of a molecule that is able to absorb photons of the excitation light and to emit photons of fluorescent light. An analyte may exhibit intrinsic fluorescence, in which case the fluorophore is a chemical component of the analyte. An analyte may be labeled with a labelling substance comprising fluorophores. Some labelling substances fluoresce only in a state in which they are bound to the analyte to be labeled, other labelling substances exhibit autofluorescence even in an unbound state.

During a fluorescence measurement, at least part of the sample volume, the observation volume, is illuminated with the excitation light of a suitable wavelength or suitable spectral range. The fluorophores present in the observation volume are excited by absorption of the photons of the excitation light, emit photons of the fluorescent light in the excited state and thus usually return to their ground state. The photons emitted in the observation volume are detected by a detector.

The fluorescence intensity or number of photons detected in an observation volume per unit of time depends, inter alia, on the number of fluorophores in the observation volume. This number is proportional to the mass concentration and/or molar concentration of the fluorescent or fluorescence-labeled analyte that includes the fluorophores, if the sample of the analyte exhibits a uniform distribution of the fluorophores in the sample.

The fluorescence intensity observed in this way depends on the number of fluorescent particles in the observation volume and thus on the concentration of the fluorescent particles in the sample.

Quantitative fluorescence-based analysis techniques exploit the dependence of fluorescence intensity observed from a sample on the concentration of the fluorescent particles in the sample. This dependence is determined by a calibration procedure by subjecting samples having a predefined value of concentration of the analyte to fluorescence measurements and determining a respective concentration-dependent parameter, in particular the fluorescence intensity. The dependence of the concentration-dependent parameter on the concentration of the analyte is established by a calibration function. The calibration function is then used in the concentration determinations for samples with unknown analyte concentrations. The value of the concentration-dependent parameter for the sample to be analyzed is measured under conditions comparable to those of the calibration procedure, and the concentration of the analyte in the sample is calculated on the basis of the measured value and the predetermined calibration function.

It is not always practical and often impossible to perform the calibration measurements specifically for the analyte. For example, a sample to be analyzed may comprise a mixture of unknown fractions of different analytes. Typically, a calibration function is established for only one reference analyte and is used in the concentration determination for different samples of chemically similar analytes.

However, this known approach is subject to considerable inaccuracy. One of the causes for this is the phenomenon of photobleaching. Photobleaching refers to the loss of ability to fluoresce caused by the irradiation with excitation light, where concerned fluorophores undergo reactions in their excited state that result in a molecular change of the fluorophores and loss thereof. Photobleaching reduces the number of photons emitted by a quantity of the analyte or reference analyte in a sample during the measurement period and detected by the detector. Therefore, a lower fluorescence signal will be observed than would be expected from the initial amount of the fluorophore in this sample.

The extent of photobleaching depends, inter alia, on the duration of irradiation with the excitation light. Since only part of the sample volume is irradiated during the measurement period, only part of the fluorophores contained in the sample are bleached. As the particles of the analyte diffuse freely in the sample, they will remain in the irradiated volume or observation volume for a limited time. This time, also known as diffusion time, is the mean time needed for a particle of the analyte to pass through the observation volume. Different analytes differ in their diffusion properties. Slower diffusing particles will stay longer within the observation volume, so the replacement by non-bleached particles will be slower. Therefore, the phenomenon of photobleaching has a greater impact on slowly diffusing particles than on faster diffusing particles. The decrease in the observed fluorescence signal will therefore be more pronounced in the case of slower diffusing particles of an analyte. As a result, the amount of fluorophores bound to slower particles will give a smaller fluorescence signal or value of the concentration-dependent parameter than the same amount of fluorophores bound to faster particles. Consequently, a calibration with a reference analyte that differs from the analyte in its diffusion properties will lead to inaccurate results when determining the concentration of the analyte.

SUMMARY

One of the objects of the present invention, therefore, is to propose a calibration method which at least partially mitigates the aforementioned problems and which can be used for preparing a concentration determination for different analytes. Another object is to provide a method for determining the concentration of a fluorescent and/or fluorescence-labeled analyte, which intends to improve the accuracy of concentration determination.

The calibration method according to the invention, which is suitable for preparing the determination of concentration of a sample sam $P_{sample}$ of a fluorescent and/or fluorescence-labeled analyte comprises the steps of:

providing a plurality N of fluorescent and/or fluorescence-labeled reference analytes $R_j$ (j=1, ..., N) which differ from one another by values $m_j$ of a diffusion measure M increasing with j;

providing at least one calibration sample, preferably a plurality of calibration samples, $P_{j,v}$ (v=1, ..., $n_j$) for each one of the reference analytes $R_j$, each having a predefined value $c_{j,v}$ of concentration C of the reference analyte $R_j$;

performing fluorescence measurements for the calibration samples $P_{j,v}$ and determining the respective value $i_{j,v}$ of a concentration-dependent parameter I from the fluorescence measurement for the respective calibration sample $P_{j,v}$;

establishing the dependence of the values i of the concentration-dependent parameter I on the values c of the respective concentration C in the calibration samples $P_{j,v}$ by a respective calibration function that is obtained by adequate fitting to the value pairs ($i_{j,v}$, $c_{j,v}$) for the respective reference analyte $R_j$; wherein within a predetermined range of c, the calibration functions can be represented as monotone increasing or decreasing functions $F_j(c)$ with values $a_j$, uniquely associated to j, of a slope parameter a corresponding to the respective derivative of the function $F_j(c)$ at c=0;

determining the value $m_j$ of the diffusion measure M for the respective reference analyte $R_j$, which influences and/or characterizes the diffusion of the reference analyte $R_j$ occurring during the fluorescence measurement;

establishing the dependence of the values of the slope parameter a on the values m of the diffusion measure M by a function E(m)=a that is obtained by adequate fitting to the value pairs ($a_j$, $m_j$).

The function E(m)=a is suitable for use in determining the concentration of a fluorescent and/or fluorescence-labeled analyte in a sample of the analyte $P_{sample}$, while this determination of the concentration of the analyte is not part of the calibration method per se. For the purpose of this determination subsequent to the calibration method, the value $m_{sample}$ of the slope parameter specific to the analyte can be determined on the basis of the function E(m)=a using the value $m_{sample}$ of the diffusion measure M specific or inherent to this analyte. The value $a_{sample}$ can be used together with the value $i_{sample}$ of the concentration-dependent parameter as determined for the sample of the analyte $P_{sample}$ to calculate the concentration $c_{sample}$ of the sample $P_{sample}$. In particular, a function $F_{sample}(c)=i$ whose derivative at c=0 gives the value $a_{sample}$ can be obtained by adequate fitting to the functions $F_j(c)=i$, and the concentration $c_{sample}$ of the sample $P_{sample}$ can be determined from the function $F_{sample}(c)=i$ for the value $a_{sample}$ and the value $i_{sample}$ as determined from the fluorescence measurement for the sample of the analyte $P_{sample}$, in particular by forming the inverse function $F^{-1}_{sample}(c)$, or by a suitable approximation technique. Approximation techniques are known per se, for example Newton's method or other iterative techniques which find a suitable value that meets a predefined accuracy, for example, in several approximation steps.

The function E(m)=a may be obtained by fitting a model function to the value pairs ($a_j$, $m_j$), wherein the parameters of the model function are determined by the fitting. Alternatively or additionally, the function E(m)=a may be provided in the form of a table or a graph. The function E(m)=a associates each value m of the diffusion measure M, at least from a range of values m, with a value a of the slope parameter.

Reference analytes are analytes that are used for establishing calibration functions. The reference analytes $R_j$ differ from each other in their diffusion properties and therefore have different values of a diffusion measure.

Various parameters can be used as the diffusion measure M, such as diffusion time TD, diffusion coefficient D, in particular translation diffusion coefficient, mean particle size, hydrodynamic radius, etc. The values for any of these different parameters may as well be calculated from the values of another one of these parameters. The values of the diffusion measure M for different analytes or reference analytes can be determined by techniques that are known per se, such as correlation analysis, fluorescence fluctuation spectroscopy, fluorescence microscopy, or techniques based on particle size, or may else be found in related literature and reference works.

The calibration method according to the invention assumes free diffusion of the analyte or reference analyte in the sample. The samples are in particular not mechanically stirred during the fluorescence measurement.

The calibration method according to the invention in particular assumes three-dimensional diffusion of the analyte or reference analyte in the sample.

The plurality N of reference analytes may in particular comprise at least three, preferably at least four, most preferably at least five fluorescent and/or fluorescence-labeled reference analytes.

The calibration sample is a sample comprising a reference analyte in a predefined concentration. The concentration may be a mass concentration or a molar concentration. The concentration may be expressed as the mass of the analyte per sample volume or number of analyte particles per volume. The concentration may in principle also be expressed as a mass or number of particles of the analyte per mass of the sample. The concentration may be expressed in percent by volume or by weight or in similar units.

In particular at least two, preferably at least three, more preferably at least four calibration samples may be provided for each reference analyte, which calibration samples have different predetermined or predefined values of concentration of the respective reference analyte.

Fluorescence measurements are in particular understood to be fluorimetric, for example spectrofluorimetric measurements. Fluorescence measurements may be performed using a fluorescence microscope and/or a fluorimeter, and a fluorimeter can be combined with a microscope. Fluorescence measurements are based on the detection of the number of photons that are emitted during a measurement period after excitation of the fluorophores by the excitation light.

Performing of a measurement is generally understood to mean performing at least once, however, the measurement may be repeated as often as desired, and a median or mean value may be determined and used as a result of the measurement.

Fluorescence measurements may in particular be performed by a technique that uses laser light as the excitation light.

Concentration-dependent parameter from the fluorescence measurement refers to a parameter whose value can be determined by fluorescence measurements and is a function of the concentration of the fluorescent or fluorescence-labeled analyte or reference analyte. The concentration-dependent parameter can be determined from the fluorescence measurement by analyzing the time profile of a fluorescence signal over a measurement period. The concentration-dependent parameter may be the fluorescence intensity, or the number of fluorescent particles in an observation volume, or the like. The concentration-dependent parameter may be determined, for example, by fluorescence correlation spectroscopy (FCS) or photon counting histogram (PCH) or by another known technique of fluorescence fluctuation spectroscopy.

The value of the concentration-dependent parameter depends on the concentration of the analyte or reference analyte, at least within a range of concentrations of the analyte or reference analyte, and changes proportionally to the change in concentration. However, at higher concentrations outside this range, effects such as reabsorption of the emitted light may occur, which reduce the experimentally determined value of the concentration-dependent parameter relative to a value expected from the dependence.

The establishing of the dependence of the values of the concentration-dependent parameter on the respective values of concentration may in particular be achieved digitally or using a processor. Manual determination of this dependence is likewise within the scope of the invention.

A calibration function may be obtained by fitting a suitable model function to the value pairs $(i_{j,v}, c_{j,v})$, whereby the fitting determines adequate values of the function parameters. The fitting may in particular be performed by a regression.

A calibration function defines the relationship between the concentration of a reference analyte and the concentration-dependent parameter that can be determined by a measurement, in particular a fluorescence measurement. The determined values of the concentration-dependent parameter are then related to the concentration. A calibration function gives a corresponding value of the concentration dependent parameter for each value of concentration, at least for each value of concentration in the range from the lowest to the highest concentration of the reference analyte for which the fluorescence measurements were performed. At least within a range of concentrations, the calibration function can be described at least approximately by a monotonically, in particular strictly monotonically increasing or decreasing mathematical function $F_j(c)$, and in particular a bijective function.

The analyte whose concentration is to be determined and the reference analytes may comprise substances that are at least chemically related and/or substances of related structure or similarly structured substances. For example, double-stranded DNA (dsDNA) may be used as a reference analyte for double-stranded DNA. dsDNA may be used as a reference analyte for dsRNA or DNA-RNA hybrids and vice versa, if these polynucleotides are fluorescence-labeled with a labelling substance that is capable of binding the different polynucleotide species equally well. Globular proteins may be used as reference analytes for globular proteins. Plastic particles may be used as reference analytes for plastic particles. Analyte and reference analytes may each comprise molecules of different chemical nature or several classes of substances at the same time, for example polynucleotides conjugated with protein molecules, or RNA polynucleotides bound to ssDNA molecules, in particular to fluorescence-labeled desoxyribo-oligonucleotides.

The analyte and the reference analytes preferably have the same number of fluorophores per amount of material or are labeled with preferably the same number of fluorophores per amount of material. Amount of material is understood to mean a mass or number of particles of the analyte or reference analytes. Some fluorescent or fluorescence-labeled analytes or reference analytes have the same number of fluorophores per particle, for example one fluorophore per particle. Some fluorescent or fluorescence-labeled analytes or reference analytes have the same number of fluorophores per unit mass. For example, polynucleotides that are labeled with an intercalating fluorophore-containing labelling substance whose molecules intercalate between nucleotide bases regardless of which bases are concerned, may have the same number of fluorophores per unit mass.

The term particle may include molecules, molecular complexes, and/or molecular fragments, but is not limited thereto.

The analyte may be a mixture of particles of different sizes.

The sample is preferably liquid. The sample may be a suspension. The sample may be a solution.

The calibration method according to the invention may serve to increase the trueness and thus the accuracy of concentration determinations for which the results of the calibration procedure are used, and to reduce systematic errors in the determination of the concentration of an analyte.

In the fitting, the same value $i_j$ for $c_j=0$ can be set for all functions $F_j(c)=i$. The value of the concentration-dependent parameter, which shall correspond to the zero value of concentration depends in particular on the properties of the measurement system, for example on the properties of the fluorophore, the labelling substance, or the measurement apparatus.

When fitting the calibration functions, the value i for $c=0$ or i-intersection of the functions $F_j(c)=i$ in a coordinate plane defined by the i-axis and the c-axis may preferably be set to be the same constant for all functions $F_j(c)$. This value may in particular correspond to a background value $i_0$ of the concentration-dependent parameter I or to the value $i_0$ from fluorescence measurements for samples with $c=0$ or for samples that were produced without addition of a reference analyte. Preferably, however, the value of i for $c=0$ is obtained as a mean value of the concentration-dependent parameter I from fluorescence measurements for samples having a very low concentration of the respective reference analyte and is assumed as a common value of the concentration-dependent parameter at $c=0$ for all functions $F_j(c)=i$. A sample has a very low value of the concentration c if the value of the concentration-dependent parameter I from the fluorescence measurement for this sample does not exceed the background value. The value i for $c=0$ may be zero, in particular when the background value is subtracted from all values i from fluorescence measurements for different samples $P_{j,v}$. In this case, the background value may in particular also be subtracted from all values i from fluorescence measurements for $P_{sample}$. The value of i for $c=0$ may be calculated as a mean value of the values of the concentration-dependent parameter for $c=0$ from the individually fitted functions $F_j(c)$.

In one embodiment of the invention, at least one of the functions $F_j(c)$ may be representable as a polynomial $F_j(c) = \text{const.}_j + a_j \cdot c + b_j \cdot c^2 + \ldots$. Here, the coefficient of the linear term, $a_j$, is the slope parameter of the function.

The absolute values of the factor $b_j$, that is the coefficient of the quadratic term, and the factors of higher degrees than two of the at least one polynomial $F_j(c)$ may in particular be small compared to the absolute value $a_j$, that is the absolute value of the coefficient of the linear term. The factors $b_j, \ldots$ of higher degrees may in particular amount to not more than 20%, preferably not more than 10% of the value $a_j$. At least in a range of concentrations, the function $F_j(c)$ may exhibit a pronounced linearity or may be substantially linear or linear with a slight curvature, in a graphical representation in a coordinate plane defined by the i-axis and the c-axis. This range of concentrations is the preferred range for determining the concentration of an analyte. The concentration of the analyte in the sample $P_{sample}$ for which the concentration is to be determined should preferably be within this range.

In one embodiment of the method, at least one polynomial $F_j(c)$ may be a second degree polynomial.

In one embodiment of the method, at least one polynomial $F_j(c)$ may be a first degree polynomial.

Preferably, the functions $F_j(c)$ may be established so as to differ only in the values $a_j$ of the slope parameter. The respective function $F_j(c)$ may be defined as a bijective function by the respective value $a_j$. For the purpose of determining the concentration of a fluorescent and/or fluorescence-labeled analyte subsequent to the calibration procedure, the value $a_{sample}$ specific to the analyte can be inserted into the function $F_j(c)=i$ so as to replace the value $a_j$ to obtain a function $F_{sample}(c)=i$ which describes an analyte-specific or customized dependence of a concentration-dependent parameter on the concentration.

The functions $F_j(c)$ may in particular be established such that starting from a function $F_k(c)$, ($k \in \{1, \ldots, N\}$) for which the parameters are determined by fitting to the value pairs $(c_{k,v}; i_{k,v})$, the other functions $F_j(c)$ are generated by rotation of the function $F_k(c)=i$ around the point (i=const.$_k$, c=0) in the coordinate plane defined by i and c about a rotation angle $\theta_j$. In particular, the function $F_k(c)$ may be a polynomial with a coefficient $a_k$ of the linear term, and the absolute values of the higher degree factors may be small compared to $a_k$. Preferably, $F_k(c)$ is a second degree polynomial with a value $a_k$ of the slope parameter and a value $b_k$ of the second degree coefficient.

In order to be able to perform such fitting, the function $$F_j(C) = -\frac{1}{4b_k}\csc\theta_j$$
$$\left(-\cos\theta_j + a_k\sin\theta_j + \sqrt{-4b_k C\sin\theta_j + (\cos\theta_j - a_k\sin\theta_j)^2}\right) \times$$
$$\left(a_k\cos\theta_j + \cos\theta_j\cot\theta_j + 2\sin\theta_j - \cot\theta_j\sqrt{-4b_k C\sin\theta_j + (\cos\theta_j - a_k\sin\theta_j)^2}\right) + \mathrm{const}$$

may be established, which includes the rotation angle $\theta$ as the parameter to be fitted, with $-\arctan a_k < \theta < \pi/2 - \arctan a_k$.

This rotatable function can be fitted to the respective value pairs $(c_{j,v}; i_{j,v})$. The parameter whose value is continuously changed by the rotation and is determined as a result of the fitting, may be the rotation angle $\theta$ between the graph of the respective function $F_j(c)$ and the graph of $F_k(c)$, with $F_j(c)=F_k(c)$ for $\theta=0$.

The respective values $a_j$ of the slope parameter which is the derivative of the function $F_j(c)$, with $\theta=\theta_j$ at c=0, can be calculated from the values $\theta$ of the rotation angle $\theta$ according to the formula $$a_j = \frac{\tan\theta_j + a_k}{1 - a_k \tan\theta_j}.$$

The fitting of the functions $F_j(c)=i$ may generally be achieved by several types of coordinate transformation.

The invention furthermore relates to a method for determining the concentration of a sample sam $P_{sample}$ of a fluorescent and/or fluorescence-labeled analyte, comprising the further steps of:
  providing a sample sam $P_{sample}$ of a fluorescent and/or fluorescence-labeled analyte for which a value $c_{sample}$ of concentration C is to be determined;
  performing a fluorescence measurement for the sample $P_{sample}$ and determining the value $i_{sample}$ of a concentration-dependent parameter I from the fluorescence measurement;
  determining the value $m_{sample}$ of a diffusion measure M which influences and/or characterizes the diffusion of the analyte occurring during the fluorescence measurement;
  determining the value $a_{sample}$ of the slope parameter a specific to the analyte on the basis of the function $E(m)=a$ using the value $m_{sample}$ of the diffusion measure M specific to the analyte; establishing a function $F_{sample}(c)=i$ whose derivative at c=0 gives the value $a_{sample}$ by adequate fitting to the functions $F_j(c)=I$; and determining the concentration $c_{sample}$ of the sample $P_{sample}$ from the function $F_{sample}(c)=i$ for the value $a_{sample}$ and from the value $i_{sample}$ as determined from the fluorescence measurement for the sample $P_{sample}$, by forming the inverse function $F^{-1}_{sample}(c)$ or by a suitable approximation technique.

The invention furthermore relates to a method for determining the concentration of a sample $P_{sample}$ of a fluorescent and/or fluorescence-labeled analyte using the function $E(m)=a$ that can be determined by a calibration method and the functions $F_j(c)=i$ for the values $a_j$ of the slope parameter a, comprising the steps of:
  providing a sample $P_{sample}$ of a fluorescent and/or fluorescence-labeled analyte for which a value $c_{sample}$ of concentration C is to be determined;
  performing a fluorescence measurement for the sample $P_{sample}$ and determining the value $i_{sample}$ of a concentration-dependent parameter I from the fluorescence measurement;
  determining the value $m_{sample}$ of a diffusion measure M which influences and/or characterizes the diffusion of the analyte occurring during the fluorescence measurement;
  determining the value $a_{sample}$ of the slope parameter a specific to the analyte on the basis of the function $E(m)=a$ using the value $m_{sample}$ of the diffusion measure M specific to the analyte; establishing a function $F_{sample}(c)=i$ whose derivative at c=0 gives the value $a_{sample}$ by adequate fitting to the functions $F_j(c)=i$; and determining the concentration $c_{sample}$ of the sample $P_{sample}$ from the function $F_{sample}(c)=i$ for the value $a_{sample}$ and from the value $i_{sample}$ as determined from the fluorescence measurement for the sample $P_{sample}$, by forming the inverse function $F^{-1}_{sample}(c)$ or by a suitable approximation technique.

Fluorescence measurements for analytes and reference analytes are expediently carried out under the same or comparable conditions, in particular with regard to the temperature of the environment during the measurement and the viscosity of the dilution medium.

Fluorescence measurements for analytes and reference analytes are in particular performed with approximately the same settings of the measurement apparatus in particular in terms of the intensity and spectral range of the excitation light. The comparability of the conditions under which the fluorescence measurements are performed may be verified on a regular basis by fluorescence measurements for a sample of a substance of known concentration and known value of a diffusion measure. The observation volume V for fluorescence microscopy may be determined by a measurement using a known concentration c of a fluorescent substance, for example.

The fluorescence measurements are preferably performed for the samples of the analyte $P_{sample}$, which have a concentration in the range which included the concentrations of the calibration samples for which the functions $F_j(c)=i$ were established, i.e. in the same calibration range. Preferably, different predetermined dilutions of the sample of the analyte are prepared and subjected to the determination of concentration, and the concentration values $c_{sample}$ derived from the fluorescence measurements in which the concentration of the analyte was within the calibration range are accepted as a result.

The method is suitable for quantifying or quantitatively analyzing fluorescent and/or fluorescence-labeled analytes, and the concentration of the analyte can be determined quantitatively. The method is particularly useful for reducing systematic errors in the determination of the concentration and for increasing the trueness and hence the accuracy of the concentration determination.

The function $F_{sample}(c)=i$ may be established by replacing the value $a_j$ in any one of the functions $F_j(c)=i$ by the value $a_{sample}$. Should the functions $F_j(c)$ include further parameters in addition to $a_j$, their values for the functions $F_{sample}(c)$ can be taken from one of the functions $F_j(c)$, for example from the function $F_j(c)$ with the value $a_j$ that is closest to the value $a_{sample}$. The values of the further parameters of any one of the functions $F_j(c)$ can be adjusted proportionally based on the ratio $a_{sample}/a_j$. The parameters, in particular the coefficients of higher degree than one of a polynomial, which are small compared to $a_j$, can in particular be neglected or assumed to be equal to zero. These and/or further approximation techniques may be combined in order to obtain the adequate fit of the function $F_{sample}(c)=i$ to the functions $F_j(c)=i$.

The values i of the concentration-dependent parameter I from fluorescence measurements may in particular be determined using a fluorimeter, in which case the concentration-dependent parameter I may be the fluorescence intensity.

The values i of the concentration-dependent parameter I from fluorescence measurements may preferably be determined using a technique based on fluorescence microscopy, in particular confocal fluorescence microscopy or multi-photon fluorescence microscopy. The concentration-dependent parameter I may be the mean fluorescence intensity <I>, the mean particle count in an observation volume <N>, or the reciprocal of the coefficient of fluorescence intensity variance $VarK^{-1}$, the variance coefficient VarK being defined as the standard deviation of the instantaneous values of fluorescence intensity I(t) as measured at different points in time divided by the mean fluorescence intensity <I>. Mean fluorescence intensity <I> is understood to mean the average fluorescence intensity over the measurement period, or the average number of photons detected in the observation volume within the time interval T divided by the duration of the time interval T, which corresponds to the measurement period (average number of photon counts in time interval T):

$$\langle I(t) \rangle_t = \frac{1}{T} \int_1^T I(t) dt.$$

The unit of fluorescence intensity is thus counts or kilo-counts per second, $kC \cdot s^{-1}$.

The fluorescence intensity of a sample depends on the amount of fluorophore in the observation volume and therefore on the concentration of the fluorophore in the sample. The sample is preferably homogeneous or contains a similar number of the particles of the analyte or reference analyte in different sub-volumes of the sample volume. Various effects that may occur on the liquid/gaseous or liquid/solid phase boundaries can be neglected for the present purpose.

Multiple repetitions of the fluorescence measurement may be performed for a sample, and the median or mean value from the repetitions may be determined as the value $i_{j,v}$.

The analyte and the reference analytes $R_j$ may comprise macromolecules, in particular polymers, preferably polynucleotides and/or oligonucleotides and/or proteins. The analyte and the reference analytes $R_j$ may comprise proteins, in particular antibodies. The proteins may comprise fluorescence-labeled antibodies or may be fluorescence-labeled by fluorescence-labeled antibodies. The analyte and the reference analytes $R_j$ may comprise plastic particles, in particular those with a size in the sub-micron range. The analyte and the reference analytes may comprise biomolecules. The biomolecules need not be derived directly from a living organism, but may have been produced and/or modified in vitro.

The analyte and the reference analytes $R_j$ may in particular comprise double-stranded polynucleotide fragments, wherein the respective reference analytes $R_j$ are each distinguished by a predetermined mean fragment length or number of base pairs in the polynucleotide fragments and differ from each other by the mean fragment length.

The fluorescent or fluorescence-labeled analyte may preferably include the same fluorophores or fluorophores with approximately the same spectral range of excitation light through which the fluorophore can be excited and approximately the same quantum yield as the fluorescent or fluorescence-labeled reference analyte. The quantum yield is determined by the ratio between the number of emitted and absorbed photons.

The analyte and the reference analytes may be fluorescence-labeled by different labelling substances, for example by a covalent and/or non-covalent bond with a labelling substance, in particular by a high-affinity bond. The labelling substance may be a fluorescence-labeled antibody. The labelling substance may be a fluorescent dye. A combination of different labelling substances is also within the scope of the invention.

Examples of fluorescent dyes which can be used to label the analyte and the reference analytes include dyes of the Alexa Fluor series, fluorescein-based dyes (e.g. FITC), SyBr series, Yoyo series, RiboGreen (ThermoFisher Scientific) and Atto series (Atto Tec GmbH).

The fluorescence-labeled analyte and the fluorescence-labeled reference analytes may be labeled with a fluorescent dye which preferably labels in a sequence-independent manner or binds to the polymeric analytes or reference analytes regardless of the specific order of the monomers in the polymer, for example the sequence of the base pairs in polynucleotides. The fluorescent dye may be able to equally well bind to DNA or RNA or may have a preference for one type of polynucleotide, or may be specific for a type of polynucleotide, e.g. bind only to dsDNA or only to dsRNA. In the latter case, the fluorescent dye can be used to label and quantify one type of polynucleotide in a mixed sample.

Diffusion time $\tau_D$, diffusion coefficient D, in particular the translation diffusion coefficient, or mean particle size may be used as the diffusion measure M. The mean particle size may be expressed as the hydrodynamic radius. The mean particle size may be expressed as the number of base pairs in double-stranded polynucleotides.

Diffusion time $\tau_D$ is understood to mean the time that is needed on average for a particle to pass through the observation volume. Therefore, the diffusion time $\tau_D$ depends on the size and shape of the observation volume.

The values m of the diffusion measure M for the analyte or the reference analytes may in particular be determined by correlation spectroscopy or correlation spectroscopy-based techniques. The values m of the diffusion measure M can be determined, for example, by dynamic light scattering.

The values m of the diffusion measure M for the analyte or the reference analytes may be determined by a fluorescence-based technique, in particular by a technique based on fluorescence microscopy, preferably confocal fluorescence microscopy or multi-photon fluorescence microscopy. For example, Fluorescence Recovery After Photobleaching (FRAP), and the fluorescence polarization technique may provide information on diffusion properties.

In a preferred embodiment of the method, the values m of the diffusion measure M for the respective analyte or reference analyte are determined by fluorescence correlation spectroscopy (FCS). Preferably, the autocorrelation technique is used in this case. An example of this technique is described in Rigler R., Mets Ü., Widengren J., Kask P., Fluorescence correlation spectroscopy with high count and low background: analysis of translational diffusion (European Biophysics J., 22 (3): 169-175, 1993).

Fluorescence correlation spectroscopy (FCS) is a particularly advantageous technique that can be used in the fluorescence measurement of the concentration-dependent parameter and in the determination of the diffusion properties. An example of FCS is described in Magde D., Webb W. W. and Elson E., Thermodynamic fluctuations in a reacting system—measurement by fluorescence correlation spectroscopy (Phys. Rev. Lett., 29: 705-708, 1972). FCS is preferably employed with confocal microscope optics or with a multiphoton microscope. Other techniques in which only a very small part of the sample volume is illuminated by the excitation light and observed by a detector are also within the scope of the invention. The photons emitted by the particles of the analyte or of the reference analyte in the observation volume can be imaged on a detector via the confocal microscope optics. The observation volume may comprise 1 fl or even less.

Fluorescence Correlation Spectroscopy (FCS) is a measurement technique that gains information from fluctuations in fluorescence intensity. With the FCS technique, a fluorescence signal is determined during a measurement period, which indicates the number of photons over the measurement period detected by the detector during the measurement period. Thus, the time profile of the number of photons detected in the observation volume can be derived from the fluorescence signal.

The fluorescence signal fluctuates due to the phenomenon of Brownian motion and the diffusion of the fluorescent particles of the analyte from the rest of the sample volume into and out of the observation volume. The number of fluorescent particles in the observation volume or particle count N varies around a mean value <N>. The particle count N is in particular Poisson distributed. Therefore, the fluorescence signal also fluctuates around a mean value during the measurement period. These fluctuations of the detected number of photons or fluctuations of fluorescence intensity I(t) or the profile of the fluorescence signal during the measurement period, i.e. the time track, are captured and analyzed in the FCS. In this way, it is possible to obtain the mean fluorescence intensity <I>, mean particle count <N>, and mean diffusion time $\tau_D$, i.e. the mean residence time of a fluorescent particle in the observation volume.

Fluorescence intensity fluctuates around a mean value <I>. These fluctuations or deviations of instantaneous fluorescence I(t) from the mean value <I> are caused by the fluctuation of the number of fluorescent particles, the particle count N, within the observation volume. The fluctuation in the number of fluorescent particles, in turn, is caused by the diffusion of the particles into and out of the observation volume, and by the loss of fluorophores due to photobleaching effects.

In order to analyze the time profiles or fluctuations of the intensity and thereby determine the values of the diffusion measure, the technique of autocorrelation can be employed, for example. The autocorrelation function $G(\tau)$ describes the self-similarity of the fluorescence signal at different points in time t and t+$\tau$, where $\tau(\tau \in \{0, \ldots, \text{measurement duration}\})$ is the time offset, known as lag time, between the points in times.

The fluctuations $\delta I(t) = I(t) - \langle I(t) \rangle$ of fluorescence intensity I can be detected over the measurement period and can be inserted into the formula $$G(\tau) = \frac{\langle \delta I(t) \cdot \delta I(t+\tau) \rangle_t}{\langle I(t) \rangle_t^2}$$

for calculating the autocorrelation values $G(\tau)$ as a function of lag time $\tau$. The angle brackets indicate the averaging over the measurement period.

The value m of the diffusion measure M for the respective analyte or reference analyte can be determined by fitting a model function $G(\tau)$ to the autocorrelation values obtained by fluorescence correlation spectroscopy.

The model function may be fitted to the autocorrelation values $G(\tau)$ according to the formula $$G(\tau) = \frac{1}{\langle N \rangle} \frac{1}{1 + \frac{\tau}{\tau_D}} \frac{1}{\sqrt{1 + \frac{r_0^2}{z_0^2} \frac{\tau}{\tau_D}}},$$

for example. The model function describes the autocorrelation values $G(\tau)$ as a function of lag time $\tau$ assuming free three-dimensional diffusion and a Gaussian distribution for the intensity of the excitation light, wherein the diffusion time $\tau_D$ is the parameter to be fitted, and wherein <N> is the mean particle count in the observation volume, and $z_0$ and $r_0$ are the radii of the observation volume in the direction of the light beam of the excitation light and perpendicular to this direction. The mean particle count <N> can also be determined by the fitting. The values $z_0$ and $r_0$ describing the shape and size of the observation volume can be determined by an FCS measurement for a sample having a known concentration of a substance whose diffusion coefficient is known.

With the value $\tau_D$, the respective diffusion coefficient D can be calculated according to the formula $$D = \frac{r_0^2}{4\tau_D},$$

as a characteristic parameter for the diffusion behavior, i.e. as the diffusion measure. Based on the value of the diffusion coefficient D, the hydrodynamic radius $R_0$ can be calculated using the Stokes-Einstein equation. Thus, all these variants of the diffusion measure M can be determined by the FCS.

According to one embodiment of the method according to the invention, the values m of the diffusion measure M for the analyte and/or the reference analytes may be determined by techniques, in particular separation techniques on the basis of particle size and/or particle shape of the analyte or of the reference analyte. Such techniques include, for example, gel electrophoresis—an example of this technique is described in J. Sambrook, T. Maniatis, D. W. Russell: Molecular cloning: a laboratory manual (3rd ed., 2001, Cold Spring Harbor Laboratory Press); free solution electrophoresis—an example of this technique is described in Heller C., Slater G. W., Mayer P., Dovichi N., Pinto D., Viovy J.-L., Drouin G., Free-solution electrophoresis of DNA. (J. of Chromatography A, 806: 113-121, 1988), or in Nkodo A. E., Garnier J. M., Tinland B., Ren H., Desruisseaux C., McCormick L. C., Drouin G., Slater G. W., Diffusion coefficient of DNA molecules during free solution electrophoresis (Electrophoresis, 22: 2424-2432, 2001); size exclusion chromatography—an example of this technique is described in La Verde V., Dominici P., Astegno A., Determination of Hydrodynamic Radius of Proteins by Size Exclusion Chromatography (bio-protocol, Vol. 7, Iss. 8, 2017), electron spin resonance spectroscopy (ESR), or nuclear magnetic resonance (NMR) diffusion spectroscopy—an example of this technique is described in Macchioni A., Ciancaleoni G., Zuccaccia C., Zuccaccia D., Determining accurate molecular sizes in solution through NMR diffusion spectroscopy (Chem. Soc. Rev. 37(3): 479-489, 2008).

For polynucleotide fragments as reference analytes, the dependence of the predetermined values $d_j$ of the diffusion coefficient D of a number of reference analytes $R_j$ having different mean fragment lengths $bp_j$ on the mean fragment lengths $bp_j$ can be described by a function $f(bp)=d$, and the function $f(bp)=d$ is obtained by adequate fitting to the value pairs $(d_j, bp_j)$. Using the function $f(bp)=d$, the value $d_{sample}$ may be determinable for an analyte comprising double-stranded polynucleotide fragments of a known mean fragment length. Vice versa, the fragment length of the analyte may be determinable using the value d, if the value d is determined by a measurement, in particular an FCS measurement.

The value d of the diffusion coefficient can be obtained from related literature, provided that the conditions under which the literature value was determined, in particular in terms of temperature and viscosity of the sample, are similar to the conditions under which the concentration is determined by the method according to the invention.

The sample $P_{sample}$ and the calibration samples $P_{j,v}$ may preferably contain a solution of the analyte or of the reference analyte in a dilution medium. Alternatively or additionally, the sample $P_{sample}$ and the calibration samples $P_{j,v}$ may be suspensions. The dilution medium may comprise water and may especially be water. The dilution medium may comprise substances that counteract aggregation of the particles of the analyte in the sample and/or adhesion of the particles to the measuring apparatus. The dilution medium may comprise substances that counteract formation of tertiary or secondary structures of polynucleotides, since such structures might affect the diffusion properties of polynucleotides, in particular of single-stranded polynucleotides.

The invention furthermore relates to a kit for determining the concentration of fluorescent or fluorescence-labeled analytes, wherein the kit comprises a plurality of fluorescent and/or fluorescence-labeled reference analytes and/or reference analytes that can be fluorescence-labeled, which differ from each other by the values m of a diffusion measure M. The kit may in particular comprise a labelling substance for labelling the analyte with the same labelling substance as the reference analytes.

The invention furthermore relates to a system comprising a fluorescence measurement apparatus and a computing unit, wherein the fluorescence measurement apparatus is configured for exciting and capturing fluorescence of a fluorescent or fluorescence-labeled analyte in an observation volume in order to obtain at least one value of a concentration-dependent parameter, and in particular comprises a light source that is capable of providing light of a wavelength that is able to excite the fluorophores of the analyte, and a detector that is capable of detecting the light emitted by the fluorophores of the analyte, wherein the computing unit includes a processor and is programmed to store and preferably analyze results of the method in particular in order to determine a concentration of the analyte in a sample.

BRIEF DESCRIPTION OF THE DRAWINGS

Further details and advantages of the invention will become apparent below from the description of preferred exemplary embodiments, without limiting the scope of the invention, and with reference to the accompanying drawings, wherein.

DETAILED DESCRIPTION

Figure 1:
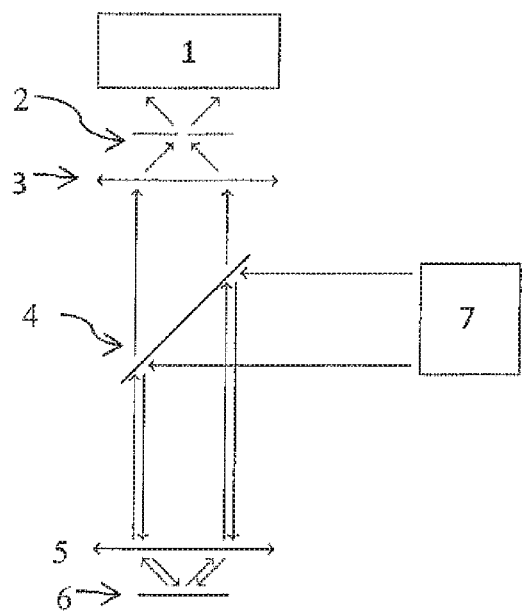
FIG. 1 shows the schematic setup of a measurement apparatus.

Eight reference analytes were provided, each comprising double-stranded DNA fragments and differing in their mean fragment length. DNA fragments having mean fragment lengths of 50 bp, 200 bp, 500 bp, 1000 bp, 2000 bp, 3000 bp, 6000 bp, and 10,000 bp were used. The mean fragment length influences the diffusion rate of the DNA fragments and can be considered as a diffusion measure. Depending on the mean fragment length, DNA fragments of different lengths are distinguished by different diffusion coefficients D and exhibit different diffusion times $\tau_D$.

A respective series of eleven calibration samples $P_{j,v}$ with different amounts of the respective DNA fragments was prepared for the DNA fragments of each of the respective fragment lengths. The calibration samples of the respective calibration series had the following DNA mass concentrations: 1, 10, 20, 40, 50, 100, 200, 400, 600, 800, and 1000 pg·µl$^{-1}$. Thus, in this example, the dilution series were prepared with eleven samples $P_{j,v}$ for DNA fragments of each of the fragment lengths 50 bp, 200 bp, 500 bp, 1000 bp, 2000 bp, 3000 bp, 6000 bp, and 10,000 bp. The calibration samples $P_{j,v}$ were prepared as solutions of the DNA fragments. The employed dilution medium was water with dimethyl sulfoxide (DMSO) in a proportion of 75% water, 25% DMSO. The samples $P_{sample}$ of the analytes for which the concentration was to be determined were likewise prepared as solutions in 75% water, 25% DMSO. DMSO was added to the water to prevent any formation of tertiary structures. Water without DMSO addition may be used as well.

In one example, the DNA fragments in the calibration samples were labeled with the fluorescent dye RiboGreen® (Thermo Fisher Scientific). This fluorescent dye binds double-stranded polynucleotides in a sequence-independent manner, i.e. irrespectively of the specific nucleotide sequence of the polynucleotides. Since the labelling agent is used in excess in the labeling of polynucleotides, all binding sites along the entire length of the DNA fragments are occupied by fluorophores, so that the number of bound fluorophores is proportional to the mass concentration of DNA. The fluorescence intensity of the dye in the bound state is several orders of magnitude higher than in the unbound state. As a result, the background value of fluorescence of the dilution medium with the fluorescent dye and without addition of the DNA fragments is relatively low. In the present example, the values of the concentration-dependent parameter were averaged from the fluorescence measurements for samples that each contained 1 pkg·µl$^{-1}$ of DNA of the reference analytes with different DNA fragment lengths and were assumed as the value of the concentration-dependent parameter at c=0 for all fluorescence measurements, since this value was not above the background value.

The samples $P_{sample}$ for which the concentration was to be determined were similarly labeled with the fluorescent dye RiboGreen®.

Fluorescence measurements were performed at about 22° C. using a confocal optical fluorescence microscope and laser light as the excitation light, with the following configuration:

TABLE 1

Example of a configuration of the measurement apparatus for fluorescence measurements

| | |
|---|---|
| Laser | Lasos LDM F series, 90 mW, 486 nm |
| Filters | Linus 1% neutral filter, BrightLine ® fluorescence filter 535/40 |
| Dichroic mirror | Linus 500 LP |
| Objective | Zeiss LD Plan-NEOFLUAR 63x/0.75 korr, ∞/0-1.5 |
| Detector | Avalanche photodiode from Micro Photon Devices, PDM series 100 µm, cooled |
| Pinhole | Diameter 100 µm |

FIG. 1 is a schematic diagram of the confocal configuration of a fluorescence microscope.

Samples of 2 µl sample volume were subjected to fluorescence measurements under irradiation with approximately 100 µW of laser power injected into the objective.

Fluorescence measurements for analytes and reference analytes were carried out under identical or comparable conditions, in particular in terms of temperature, duration of measurement period, and settings of the measurement apparatus.

Figure 2:
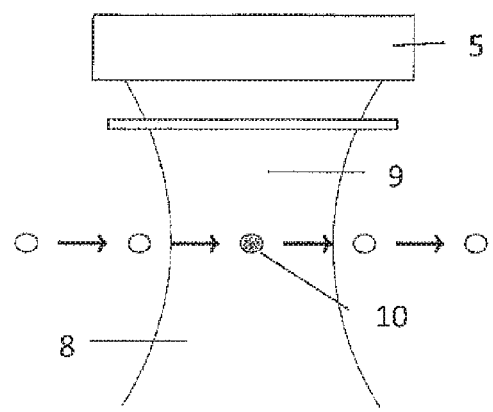
FIG. 2 schematically illustrates a fluorescent or fluorescence-labeled particle diffusing during the fluorescence measurements.

The profile of the fluorescence signal, or the number of photons emitted by the fluorophores in the observation volume during the measurement period and detected by the detector at different points in time was recorded during the measurement period of 30 s. The observation volume was about 1 fl and hence a small portion of the sample volume. Since the analyte particles diffuse into and out of the observation volume from the rest of the sample volume, as schematically illustrated in FIG. 2, the number of particles in the observation volume and thus the fluorescence signal fluctuates around the mean value during the measurement period. These fluctuations of the detected photon count or fluctuations of fluorescence intensity or the time profile of the fluorescence signal during the measurement period, the time track, was recorded and processed by fluorescence correlation spectroscopy (FCS) using the ALV correlator card. Depending on the exemplary embodiment, the processed data were used to determine the values of one of the concentration-dependent parameters on the basis of the fluorescence measurement, i.a. mean fluorescence intensity <I>, mean particle count <N> in the observation volume, and/or reciprocal of the coefficient of fluorescence intensity variation, VarK-1. Furthermore, the data processed using the ALV correlator card were used to determine the diffusion properties of the analyte in the sample, or of a diffusion measure M. Using the correlator map, the autocorrelation values G(τ) were calculated for different values of lag time τ, with 0≤τ≤duration of measurement period, according to the formula $$G(\tau) = \frac{\langle \delta I(t) \cdot \delta I(t+\tau) \rangle_t}{\langle I(t) \rangle_t^2}.$$

Figure 3:
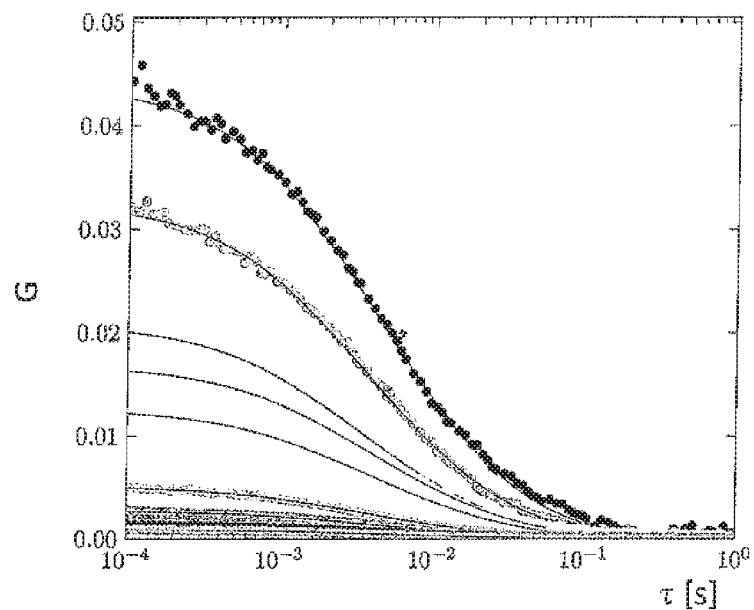
FIG. 3 is a graphical representation showing exemplary autocorrelation data from fluorescence measurements for labeled 50 bp DNA fragments with the autocorrelation function fitted to the data.

These autocorrelation data or value pairs (G(τ),τ) are shown in FIG. 3, by way of example, as points in the coordinate plane defined by the G-axis and the τ-axis. A model function G(τ) was fitted to the autocorrelation data to determine the values for the function parameters. In one exemplary embodiment, the model function according to the formula $$G(\tau) = \frac{1}{\langle N \rangle} \frac{1}{1+\frac{\tau}{\tau_D}} \frac{1}{\sqrt{1+\frac{r_0^2}{z_0^2}\frac{\tau}{\tau_D}}}$$

was used, which includes the diffusion time $\tau_D$ as a parameter. With the fitting, the diffusion time $\tau_D$ for the analyte was determined as the diffusion measure. In one exemplary embodiment, the corresponding diffusion coefficient D was calculated as the characteristic parameter for the diffusion behavior or as the diffusion measure, from the value $\tau_D$ according to the formula $$D = \frac{r_0^2}{4\tau_D}.$$

The size and shape of the observation volume or the dimensions of the observation volume in the direction of the light beam of the excitation light, $2z_0$, and perpendicular to this direction, $2r_0$, were determined by fluorescence measurements according to the FCS technique for a sample with a known concentration of a substance with a known diffusion coefficient D, for example with the fluorescent dye Alexa 488 (Thermo Fisher Scientific) that has a diffusion coefficient of 435 μm² s⁻¹ previously known from literature (e.g. from Petrášek and Schwille, Biophysical J., 94(4): 1437-1448, 2008).

Figure 4:
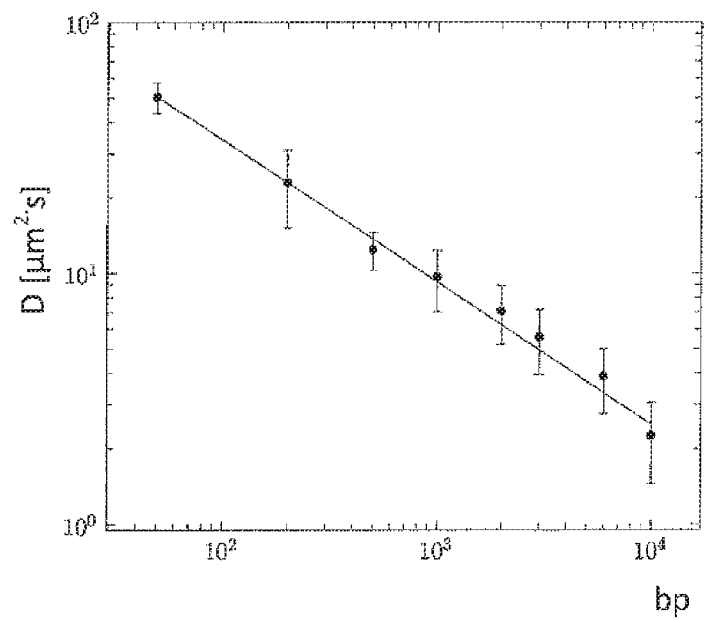
FIG. 4 is a graphical representation illustrating the dependence of the values of the diffusion coefficient D [$\mu m^2$ s] of double-stranded DNA fragments of different mean fragment lengths on the mean fragment lengths [bp] as determined according to a partial aspect of the method according to the invention.

The values of the diffusion coefficient D determined by the FCS for DNA fragments of different fragment lengths were used to establish the dependence between the different diffusion measures, particle size—here the fragment length—and diffusion coefficient D. The model function D=f(bp)=$k_1$×bp$^{k2}$ was fitted to the value pairs (D, bp) and the following relationship was found for DNA fragments in aqueous solutions at 22° C.: D=494.065×bp$^{-0.567}$, where bp is the fragment length or number of base pairs. FIG. 4 shows a graphical representation of the fitting result. The determined ratio enables to determine the diffusion coefficients D for DNA fragments for which the fragment lengths are known or were determined by other techniques such as by analysis of DNA mixtures by particle size-based separation methods or analysis methods which allow to determine the particle size, such as, e.g., electrophoresis or size-exclusion chromatography. From the value D, the value of the diffusion time $\tau_D$ can be calculated according to the formula $$\tau_D = \frac{r_0^2}{4D}$$

if the shape and size of the observation volume were determined by fluorescence measurements for a sample with a known concentration of a substance for which the diffusion coefficient D is known.

Figure 5:
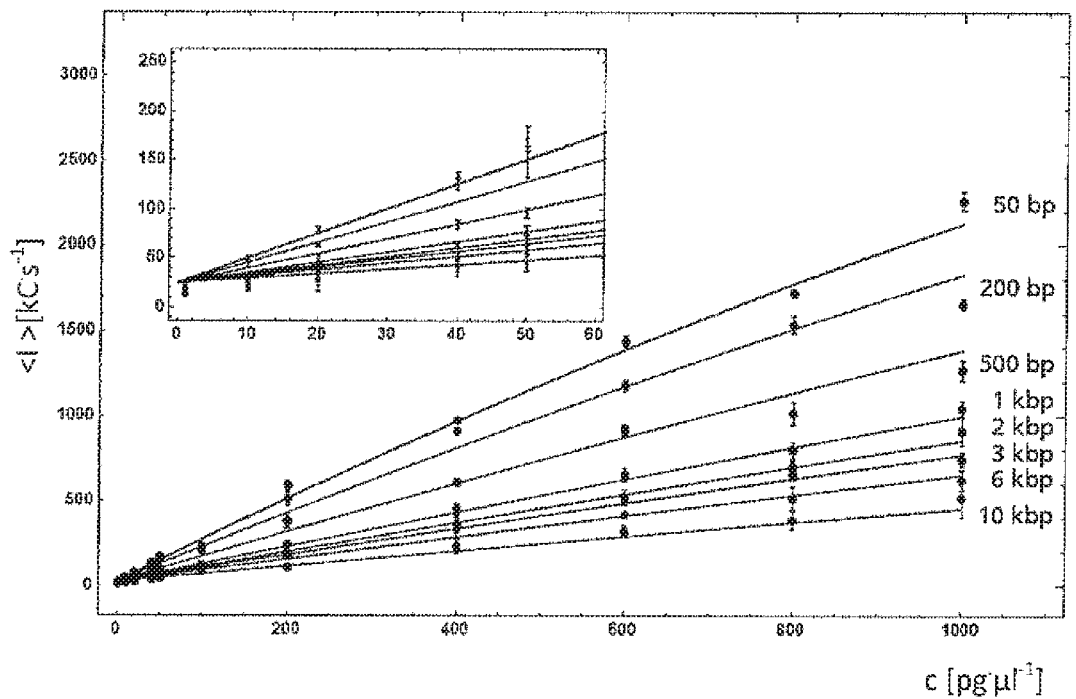
FIG. 5 is a graphical representation of the calibration functions for double-stranded DNA fragments of different mean fragment lengths (50 bp, 200 bp, 500 bp, 1 kbp, 2 kbp, 3 kbp, 6 kbp, 10 kbp) in the coordinate plane defined by the i-axis and c-axis according to one embodiment of the invention, wherein the calibration functions for 200 bp, 500 bp, 1 kbp, 2 kbp, 3 kbp, 6 kbp and 10 kbp DNA fragments were fitted by rotation of the quadratic calibration function for 50 bp DNA fragments around the i-axis intersection, where i denotes the mean fluorescence intensity [kCps], and C denotes the concentration, [pg/μl]
Figure 7:
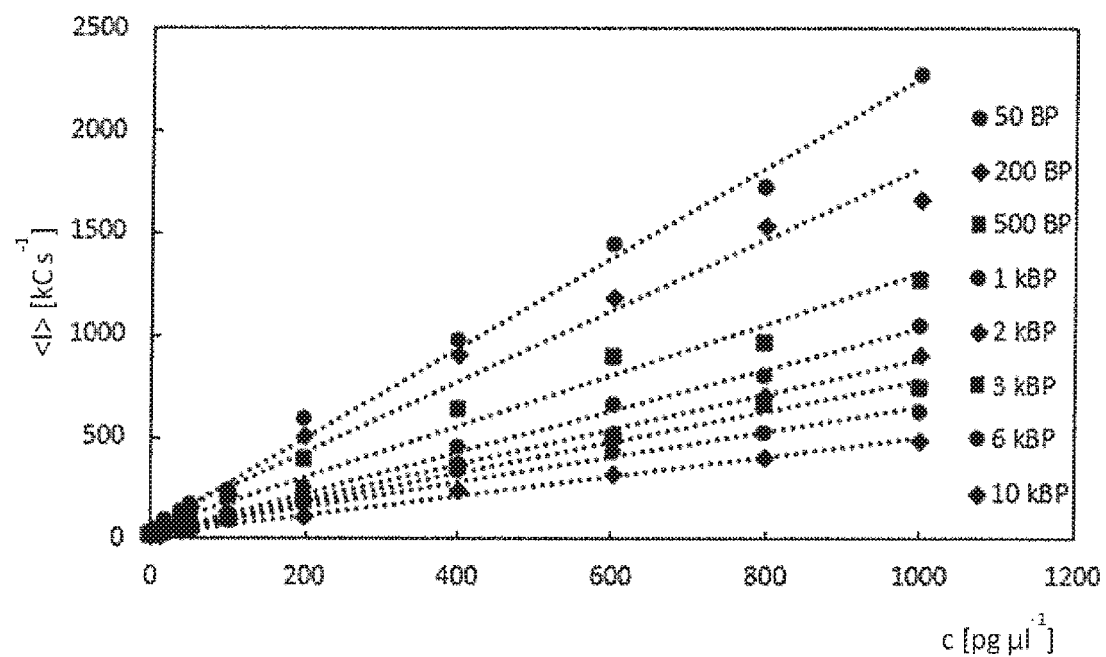
FIG. 7 is a graphical representation of the calibration functions as established by a linear fit for double-stranded DNA fragments of different mean fragment lengths (50 bp, 200 bp, 500 bp, 1 kbp, 2 kbp, 3 kbp, 6 kbp, 10 kbp) in the coordinate plane defined by the i-axis and the c-axis according to one embodiment of the invention, where i stands for the values of mean fluorescence intensity [kilocounts/s], and C for the concentration, [pg·µl$^{-1}$]
Figure 9:
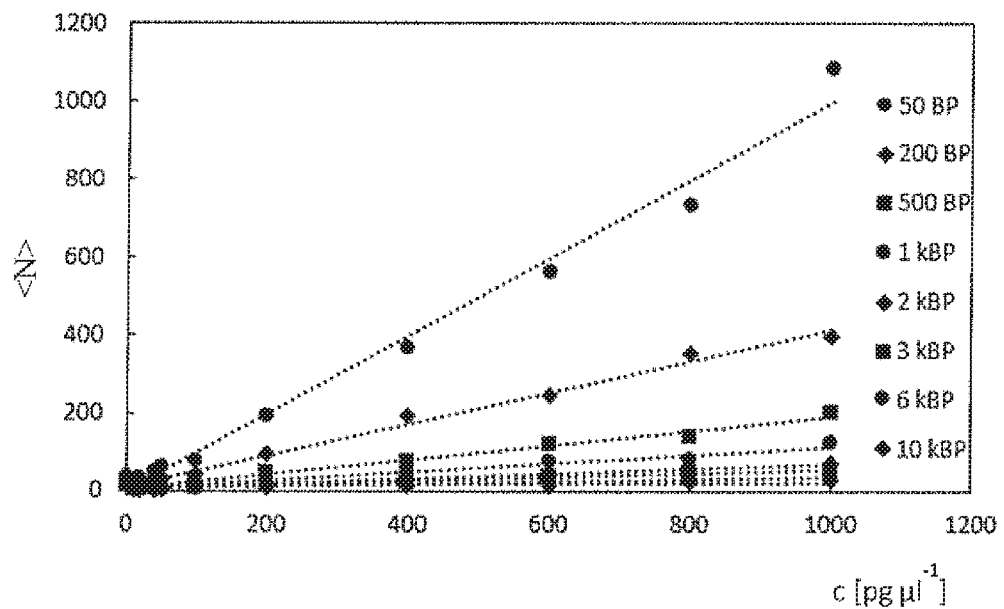
FIG. 9 is a graphical representation of the calibration functions as established by a linear fit for double-stranded DNA fragments of different mean fragment lengths (50 bp, 200 bp, 500 bp, 1 kbp, 2 kbp, 3 kbp, 6 kbp, 10 kbp) in the coordinate plane defined by the <N>-axis and the c-axis according to one embodiment of the invention, where <N> stands for the values of mean particle count in the observation volume, and C for the concentration, [pg·µl$^{-1}$]
Figure 11:
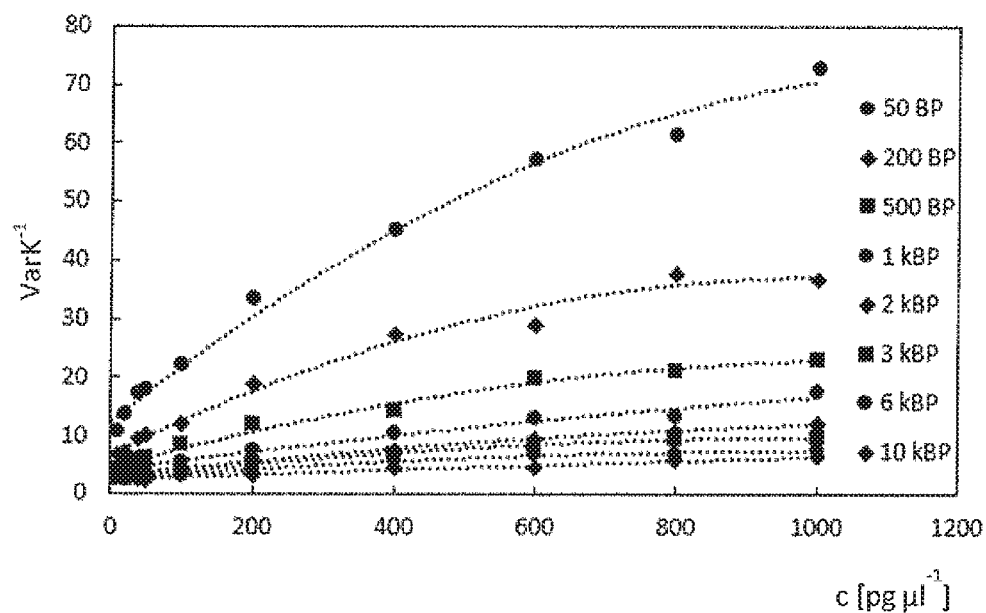
FIG. 11 is a graphical representation of the calibration functions as established by a quadratic fit for double-stranded DNA fragments with different mean fragment lengths (50 bp, 200 bp, 500 bp, 1 kbp, 2 kbp, 3 kbp, 6 kbp, 10 kbp) in the coordinate plane defined by the 1/VarK-axis and the c-axis according to one embodiment of the invention, wherein 1/VarK is the reciprocal of the coefficient of fluorescence intensity variance, and C is the concentration, [pg/µl]

Fluorescence measurements were performed five times for each sample $P_{j,v}$, $P_{sample}$, a median value was calculated and was assumed as the measurement result of the concentration-dependent parameter for the respective sample. The measurement results for the respective calibration series comprising calibration samples with different values c of concentration C are shown in FIGS. 5, 7, 9, and 11. In the figures, the fluorescence measurement results for the calibration series for the DNA fragments of different fragment lengths are shown as points, and the graphs of the functions that were fitted to the measurement results and which establish the dependence of the corresponding concentration-dependent parameter on the concentration are shown as lines. FIGS. 5 and 7 show the mean fluorescence intensity <I>, FIG. 9 shows the mean particle count <N> in the observation volume, and FIG. 11 shows the reciprocal of the coefficient of fluorescence intensity variation, VarK⁻¹, from the FCS, as a function of the concentration in each case.

In an exemplary embodiment according to FIG. 5, the calibration functions were established as described below. First, a function $F_{50bp}$ (c) was established for the 50 bp DNA fragments by fitting a quadratic function or a second degree polynomial $$F_{50bp}(c) = \text{const.} a_{50bp} \times c + b_{50bp} \times c^2 = i$$

to the value pairs of the 50 bp calibration series, i.e. to the measurement results for the mean fluorescence intensity <I> from FCS, and values $a_{50bp}$=2.68 and $b_{50bp}$=-0.0006 were determined. The value const.=16.417 was calculated in this exemplary embodiment as a mean value from fluorescence measurements for samples with 1 pg·μl⁻¹ DNA of different fragment lengths. The value $a_{50bp}$ of the slope parameter a is the derivative of the function $F_{50bp}$(c) at c=0. The functions $F_j$(c) for the other calibration series were fitted to the respective value pairs for 200 bp, 500 bp, etc. DNA fragments by rotation of the function $F_{50bp}$(c) in the coordinate plane defined by the i-axis and the c-axis around the i-axis intersection (i=const, c=0). The parameter whose values were continuously changed by the rotation and determined as a result of the fitting was the rotation angle θ between the graph of the respective function $F_j(c)$ and the graph of $F_{50bp}(c)$.

In order to be able to perform such a fitting, first the function $$F_j(C) = -\frac{1}{4b_{50bp}} \csc \theta_j \left( -\cos\theta_j + a_{50bp} \sin \theta_j + \right.$$
$$\sqrt{-4b_{50bp}C \sin \theta_j + (\cos \theta_j - a_{50bp} \sin \theta_j)^2} \times$$
$$\left( a_{50bp} \cos\theta_j + \cos \theta_j \cot\theta_j + 2 \sin \theta_j - \right.$$
$$\left. \cot \theta_j \sqrt{-4b_{50bp}C \sin \theta_j + (\cos \theta_j - a_{50bp}\sin\theta_j)^2} \right) + \text{const}$$

was established, which includes the rotation angle θ as the parameter to be fitted, with $\arctan a_k < \theta < \pi/2 - \arctan a_k$. The fitting value $\theta_j$ for the rotation angle θ was determined for each of the calibration series by fitting the function $F_j(c)$ to the value pairs of the calibration series. The respective values of the factor $a_j$ which represents the derivative of the function $F_j(c)$ with $\theta=\theta_j$ at $c=0$ were calculated from the values $\theta_j$ of the rotation angle θ according to the formula $$a_j = \frac{\tan \theta_j + a_{50bp}}{1 - a_{50bp} \tan \theta_j}.$$

Figure 6:
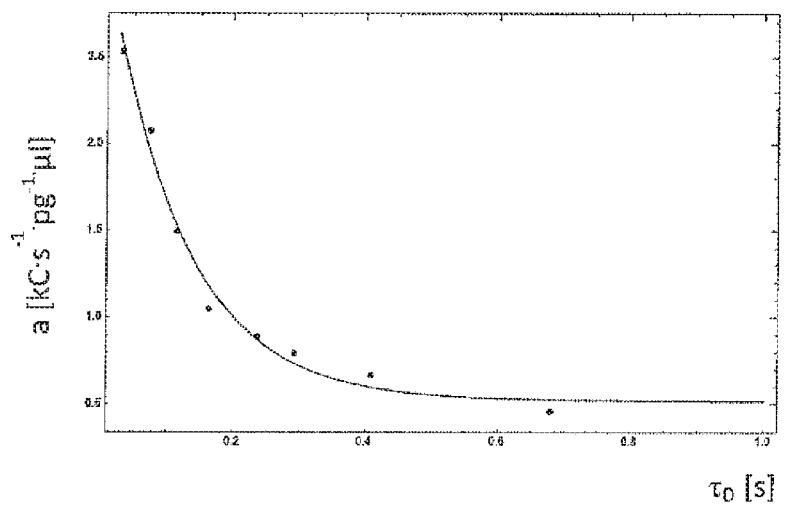
FIG. 6 is a graphical representation of the function $E(\tau_D)=a$ according to one embodiment of the invention, describing the dependence of the values of slope parameter a on the diffusion time $\tau_D$ [s], where a [kilocounts·$s^{-1}$·$pg^{-1}$·μl] corresponds to the slopes of the curve tangents of the graphs of FIG. 5 at c=0 or derivatives of the respective functions at c=0.

In the present exemplary embodiment, the values $a_j$ of the slope parameter a as determined for the DNA fragments of different fragment length were associated with the values of diffusion time $\tau_D$ for the respective DNA fragments. The respective value pairs $(a_j, \tau_{Dj})$ are illustrated in FIG. 6 by points in the coordinate plane defined by the a-axis and the $\tau_D$-axis.

In order to establish the dependence of the slope parameter a on the diffusion time $\tau_D$, a probability-based approach was chosen, according to which, first, the mean number of fluorescence events $N_f$ was represented as a function of the diffusion time $\tau_D$ according to the formula $$N_f(\tau_D) = \frac{k_f}{k_{bl}}(1 - e^{-k_{bl}\tau_D}),$$

where $k_f$ [s$^{-1}$] is the fluorescence rate and $k_{bl}$ [s$^{-1}$] is the bleaching rate. The relationship $k_f/k_{bl}$ together with the dimensional prefactor $k_{dim}$ [counts·pg$^{-1}$·µl] was expressed as a coefficient $k_{int}$ [counts·pg$^{-1}$ µl]: $k_{int} = k_{dim} \cdot k_f/k_{bl}$. Furthermore, the term was divided by $\tau_D$ to obtain the number of fluorescence photons as a function of the diffusion time $\tau_D$, and a constant was added, since even for great values of diffusion time the function values $E(\tau_D)$ must be greater than zero. From this follows the model function $$E(\tau_D) = a = \frac{k_{int}}{\tau_D}(1 - e^{-k_{bl}\tau_D}) + \text{const}.$$

representing the slope parameter a as a function of the diffusion time $\tau_D$. By fitting this function to the value pairs $(a_j, \tau_D)$, the following parameter values were determined: $k_{int} = 0.176$; $k_{bl} = 19.016$; constant $= 0.257$. The result is shown in FIG. 6 as a line of the graph of the function $$E(\tau_D) = a = \frac{0.176}{\tau_D}(1 - e^{-19.016\tau_D}) + 0.257.$$

The function $E(\tau_D)=a$ allows to determine the analyte-specific values of the slope parameter a for analytes with predetermined diffusion times $\tau_D$ in order to use these values in the determination of the concentration of the analyte.

A further exemplary embodiment shows the use of the function $E(\tau_D)=a$ in the determination of the concentration of different samples $P_{sample}$. To verify the method, a plurality of samples of the DNA solutions were prepared with predetermined mixtures of double-stranded DNA fragments of different fragment lengths and were subjected to the concentration determination according to an exemplary embodiment of the method according to the invention. The eleven DNA mixtures which were prepared as analytes are listed in Table 2. Each of the mixtures contained DNA fragments of two fragment lengths in the indicated mass ratio. For each of the mixtures, dilutions were prepared with four different DNA mass concentrations: 20 pg/µl, 50 pg/µl, 100 pg/µl, and 200 pg/pl. All concentrations of analytes in the samples $P_{sample}$ were within the range of concentrations of the calibration samples that were used to establish the functions $F_j(c)$.

The DNA fragments in the samples $P_{sample}$ were labeled with the fluorescent dye RiboGreen® and subjected to fluorescence measurements using the confocal fluorescence microscope as described above. Fluorescence Correlation Spectroscopy (FCS) was used to determine the values of mean fluorescence intensity $i_{sample}$ and diffusion time $\tau_{Dsample}$ for each of the samples $P_{sample}$. Five fluorescence measurements were performed for each sample $P_{sample}$, and the median value was used as the measured value. The analyte-specific values $a_{sample}$ corresponding to the analyte-specific diffusion times $\tau_{Dsample}$ were determined for different samples $P_{sample}$ according to the formula $$a_{sample} = \frac{0.176}{\tau_{Dsample}}(1 - e^{-19.016\tau_{Dsample}}) + 0.257.$$

On the basis of the measured value $i_{sample}$ and the respective value $a_{sample}$, the concentration $c_{sample}$ was calculated using the formula $$\theta_{sample} = \arctan\left(\frac{-a_{50bp} + a_{sample}}{1 + a_{50bp}a_{sample}}\right)$$

for the value of rotation angle $\theta_{sample}$ and the formula $$c_{sample} = \frac{1}{4}\left( -\frac{2a_{50bp} \cos \theta_{sample}}{b_{50bp}} - \right.$$
$$\frac{2 \sin \theta_{sample}}{b_{50bp}} + 4 \text{const} \tan \theta_{sample} - 4 I_{sample} \tan \theta_{sample} -$$
$$\frac{2a_{50bp} \sin \theta_{sample} \tan \theta_{sample}}{b} - \frac{2 \sin \theta_{sample} \tan^2 \theta_{sample}}{b_{50bp}} \right) -$$
$$\frac{1}{b_{50bp}}\sqrt{2} \sin \theta_{sample} \times \{-8b_{50bp} \text{const} \cot \theta_{sample} \csc^5 \theta_{sample} +$$
$$8b_{50bp}I_{sample} \cot \theta_{sample} \csc^5 \theta_{sample} + \csc^6 \theta_{sample} +$$

-continued $$a_{50bp}^2 \csc^6 \theta_{sample} - \cos(2\theta_{sample}) \csc^6 \theta_{sample} +$$

$$a_{50bp}^2 \cos(2\theta_{sample})\csc^6 \theta_{sample} + 2a_{50bp} \csc^6 \theta_{sample} \sin(2\theta_{sample})\}^{1/2}$$

$$\tan^2 \theta_{sample,}$$

with $a_{50bp}=2.68$; $b_{50bp}=-0.0006$; const.=16.417. The values are summarized in Table 2.

TABLE 2

Determination of mass concentration of the DNA mixtures prepared with concentrations of 20 pg/µl, 50 pg/µl, 100 pg/µl, and 200 pg/µl.

| Fragment lengths in the mixtures, bp | Mixing ratio | DNA concentrations employed, pg/µl | | | |
|---|---|---|---|---|---|
| | | 20 | 50 | 100 | 200 |
| 50 and 1000 | 1:1 | 21.01 | 47.77 | 111.38 | 214.21 |
| 50 and 1000 | 1:2 | 17.47 | 51.98 | 97.57 | 176.96 |
| 50 and 1000 | 1:3 | 20.51 | 49.29 | 92.91 | 210.87 |
| 50 and 1000 | 1:4 | 19.04 | 49.70 | 93.78 | 208.29 |
| 50 and 1000 | 1:5 | 19.62 | 44.80 | 96.71 | 190.54 |
| 50 and 1000 | 1:6 | 17.52 | 45.37 | 104.06 | 165.71 |
| 200 and 500 | 1:1 | 24.98 | 54.99 | 99.59 | 204.91 |
| 200 and 500 | 1:2 | 23.78 | 53.02 | 93.66 | 206.66 |
| 200 and 500 | 1:3 | 16.05 | 42.71 | 94.54 | 200.74 |
| 200 and 500 | 1:4 | 30.47 | 51.44 | 95.79 | 202.47 |
| 200 and 500 | 1:5 | 28.40 | 46.72 | 103.98 | 195.55 |
| Mean value, pg/µl | | 21.71 | 48.89 | 98.54 | 197.90 |
| Variance coefficient, % | | 23.31 | 7.60 | 5.76 | 7.47 |
| Standard deviation, % | | 8.57 | −2.22 | −1.46 | −1.05 |

Figure 13:
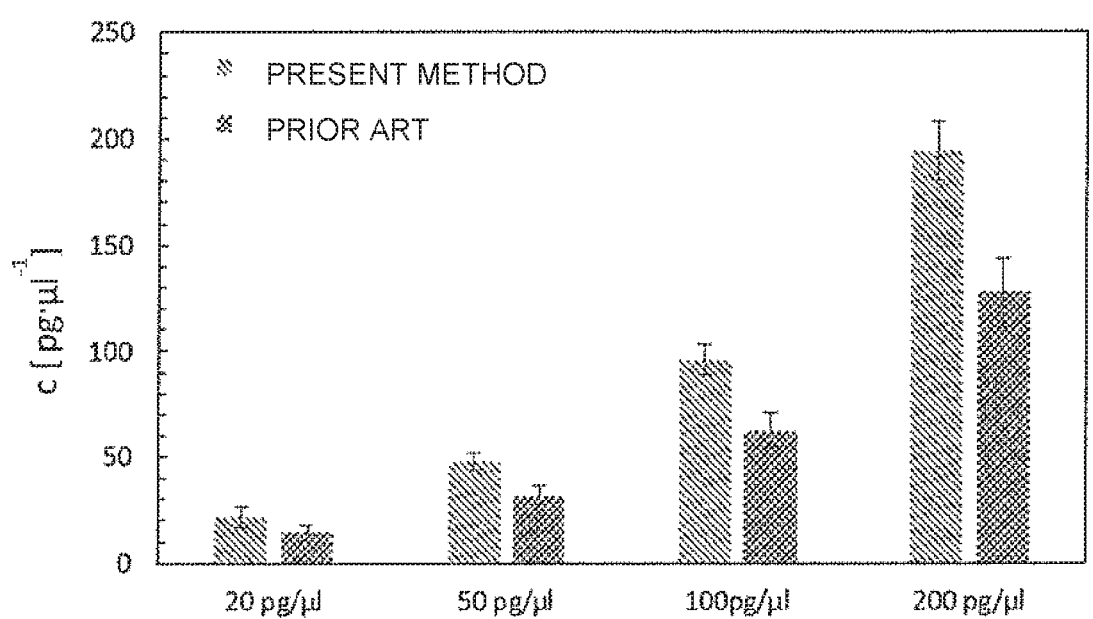
FIG. 13 shows a comparison of the results of the concentration determinations for samples of the analytes comprising different predefined mixtures of double-stranded DNA fragments, which were performed in each case according to the prior art and according to an exemplary embodiment of the method of the invention according to FIGS. 5, 6.

FIG. 13 shows a comparison of the results of the concentration determinations for samples $P_{sample}$, which were performed according to the prior art using the calibration function that was established for 50 bp DNA fragments, as well as according to the exemplary embodiment of the method according to the invention described above. The values of DNA concentration as determined according to the exemplary embodiment of the method according to the invention have a higher accuracy and thus are closer to the expected value of concentration than the values obtained by the conventional method. The method of the invention takes into account the influence of diffusion of the analytes on the fluorescence measurements and thus improves the trueness concentration determination even for very low concentrations such as, e.g., 20 pg/µl.

Figure 8:
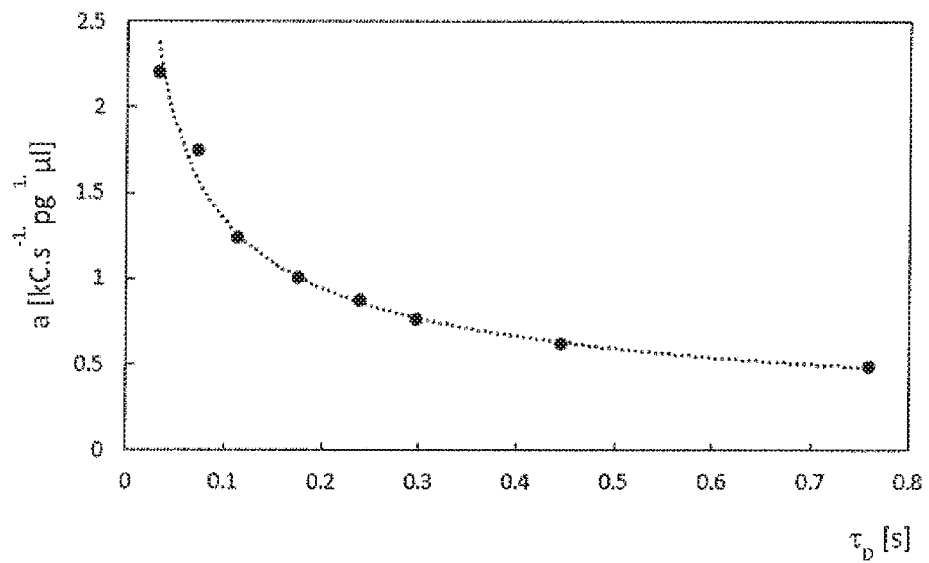
FIG. 8 is a graphical representation of the function $E(\tau_D)=a$ according to one embodiment of the invention, describing the dependence of slope parameter a [kilocounts·s$^{-1}$·pg$^{-1}$·µl] of the calibration functions or of the slopes of the graphs of FIG. 7 on diffusion time $\tau_D$ [s]
Figure 10:
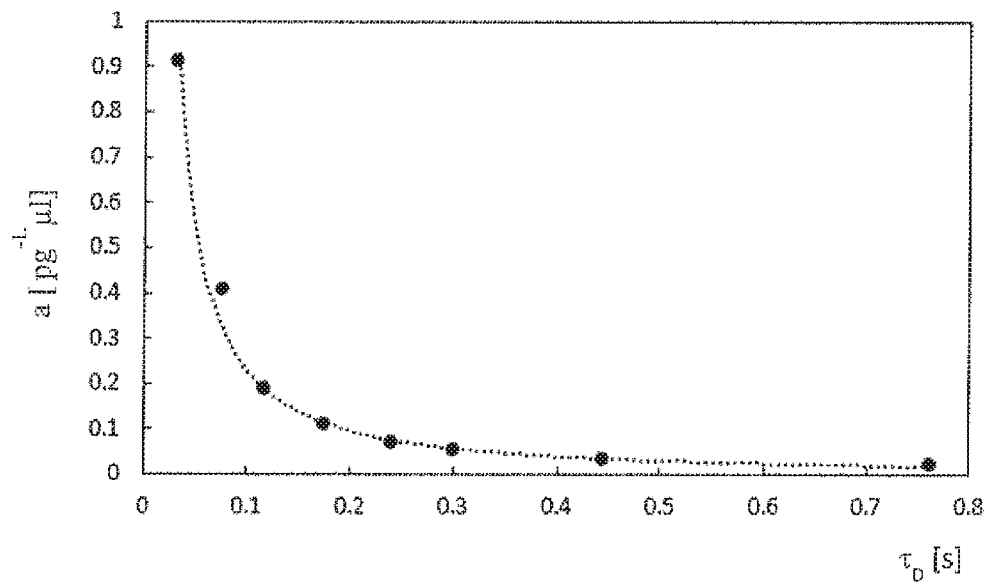
FIG. 10 is a graphical representation of the function $E(\tau_D)=a$ according to one embodiment of the invention, describing the dependence of the slope parameter a [pg$^{-1}$·µl] of the calibration functions or of the slopes of the graphs of FIG. 9 on diffusion time $\tau_D$ [s]

In further exemplary embodiments according to FIGS. 7 and 9, the calibration functions were established by fitting a respective linear function or first degree polynomial $F_j$ (c)=const.+$a_j$×c to the FCS measurement results for mean fluorescence intensity <I> or mean particle count <N>. The value of 'const.' from the respective fitting for the different calibration series was averaged and the mean value was assumed as the same value for all functions $F_j$(c). The values $a_j$ of slope parameter a for the respective calibration series as determined from the fitting indicate the slope of the respective calibration straight line. The calibration functions of FIGS. 7 and 9 can thus be represented as first degree polynomials with the respective values $a_j$ of slope parameter a within the entire illustrated range of concentrations C from 1 to 1000 pg/µl. Different values $a_j$ of the different calibration series were related to the values m of a diffusion measure M for the respective DNA fragments by the function E(m)=a, as is shown in FIGS. 8 and 10 for the diffusion time $\tau_D$ as the diffusion measure.

Figure 12:
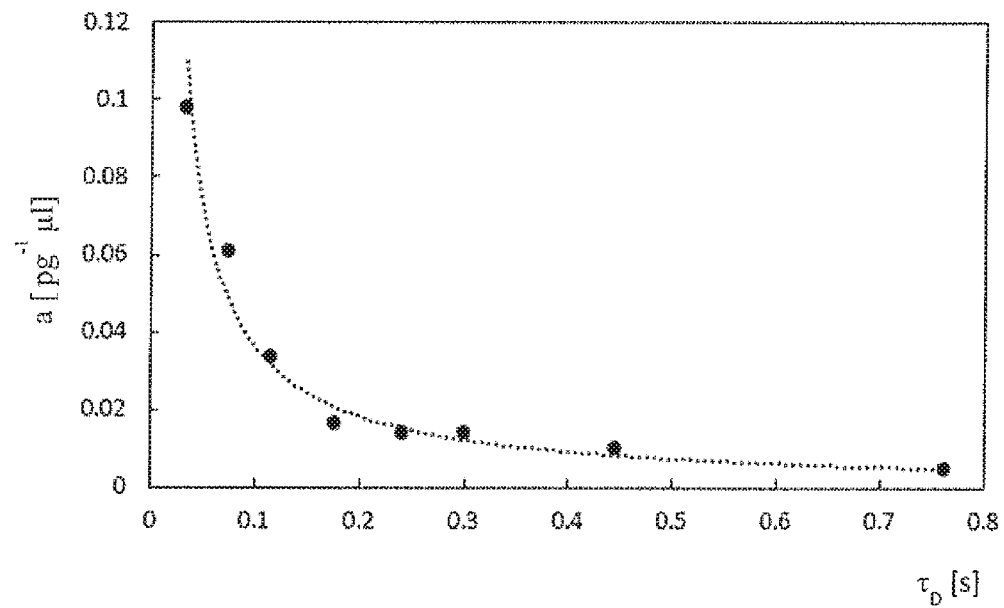
FIG. 12 is a graphical representation of the function $E(\tau_D)=a$ according to one embodiment of the invention, describing the dependence of slope parameter a [pg$^{-1}$·µl] on the diffusion time $\tau_D$, [s], wherein a corresponds to the slopes of the curve tangents of the graphs of FIG. 11 at c=0 or derivatives of the corresponding functions at c=0 here.

The calibration functions of FIG. 11 were each established by fitting a quadratic function or second degree polynomial $F_j$ (c)=const.+$a_j$×c+$b_j$×$c^2$ to the FCS measurement results for VarK$^{-1}$. The value of 'const.' from the respective fitting for the different calibration series was averaged and the mean value was assumed as the same value for all functions $F_j$(c). By the fitting, the respective values of slope parameter $a_j$ and of second degree coefficient $b_j$ were determined. Thus, within the entire illustrated range of concentrations C from 1 to 1000 pg/µl, the calibration functions of FIG. 11 can be represented as second degree polynomials with the values $a_j$ of slope parameter a. Different calibration series with different values $a_j$ of slope parameter a were related to the values m of a diffusion measure M for the respective DNA fragments by the function E(m)=a, as is shown in FIG. 12 for the diffusion time $\tau_D$ as the diffusion measure, for example.

LIST OF REFERENCE NUMERALS

1 Detector
2 Pinhole
3 Lens
4 Dichroic mirror
5 Objective
6 Object level
7 Laser
8 Light beam of excitation light
9 Observation volume
10 Diffusing particle

What is claimed is:

1. A calibration method suitable for preparing determination of the concentration of a fluorescent and/or fluorescence-labeled analyte of a sample $P_{sample}$, comprising the steps of:
   providing a plurality N of fluorescent and/or fluorescence-labeled reference analytes $R_j$ (j=1, ..., N) which differ from one another by values $m_j$ of a diffusion measure M increasing with j;
   providing at least one calibration sample $P_{j,v}$ (v=1, ..., $N_j$) for each one of the reference analytes $R_j$, each having a predefined value $c_{j,v}$ of concentration C of the reference analyte $R_j$;
   performing fluorescence measurements for the calibration samples $P_{j,v}$ and determining a respective value $i_{j,v}$ of a concentration-dependent parameter I from the fluorescence measurement for the respective calibration sample $P_{j,v}$;
   establishing a dependence of the values i of the concentration-dependent parameter I on the values c of the respective concentration C in the calibration samples $P_{j,v}$ by a respective calibration function that is obtained by adequate fitting to the value pairs ($i_{j,v}$, $c_{j,v}$) for the respective reference analyte $R_j$;
   wherein within a predetermined range of c, the calibration functions can be represented as monotone increasing or decreasing functions $F_j$(c) with values $a_j$, uniquely associated to j, of a slope parameter a corresponding to a respective derivative of the function $F_j$(c) at c=0;
   determining the value $m_j$ of the diffusion measure M for the respective reference analyte $R_j$, which influences and/or characterizes the diffusion of the reference analyte $R_j$ occurring during the fluorescence measurement; and
   establishing the dependence of the values of the slope parameter a on the values m of the diffusion measure M by a function E(m)=a that is obtained by adequate fitting to the value pairs ($a_j$, $m_j$);

wherein the function $E(m)=a$ can be used in the determination of the concentration of a fluorescent and/or fluorescence-labeled analyte, wherein for the purpose of this determination subsequent to the calibration method, the value $a_{sample}$ specific to the analyte is determined from the function $E(m)=a$ using the value $m_{sample}$ of the diffusion measure M specific to said analyte, and a function $F_{sample}(c)=i$ whose derivative at $c=0$ gives the value $a_{sample}$ is obtained by adequate fitting to the functions $F_j(c)=i$, and wherein the concentration $c_{sample}$ of the sample $P_{sample}$ is determined from the function $F_{sample}(c)=i$ for the value $a_{sample}$ and from the value $i_{sample}$ as determined from the fluorescence measurement for the sample $P_{sample}$ of said analyte by forming the inverse function $F^{-1}_{sample}(c)$ or by a suitable approximation technique.

2. The calibration method of claim 1, wherein the same value $i_j$ is set for $c_j=0$ for all functions $F_j(c)=i$ in the fitting.

3. The calibration method of claim 1, wherein at least one of the functions $F_j(c)$ can be represented as a polynomial $F_j(c)=\text{const.}_j+a_j\cdot c+b_j\cdot c^2+\ldots$.

4. The calibration method of claim 3, wherein the absolute values of the factors $b_j, \ldots$ of higher degrees than two of the at least one polynomial $F_j(c)$ are small relative to the absolute value of $a_j$.

5. The calibration method of claim 3, wherein the at least one polynomial $F_j(c)$ is a second degree polynomial.

6. The calibration method of claim 3, wherein the at least one polynomial $F_j(c)$ is a first degree polynomial.

7. The calibration method as claimed in claim 1, wherein the functions $F_j(c)$ differ only in the values $a_j$, wherein for the purpose of determination of the concentration of a fluorescent and/or fluorescence-labeled analyte subsequent to the calibration method, the value $a_{sample}$ specific to the analyte is inserted into the function $F_j(c)=i$ instead of the value $a_j$.

8. The calibration method of claim 7, wherein starting from a function $F_k(c)$, ($k\in\{1,\ldots,N\}$), the other functions $F_j(c)$ can be generated by rotation of the function $F_k(c)=i$ around the point ($i=\text{const.}_k$, $c=0$) in the coordinate plane defined by i and c.

9. A method for determining the concentration of a sample $P_{sample}$ of a fluorescent and/or fluorescence-labeled analyte, wherein the method includes a calibration method according to claim 1 and comprises the further steps of:
  providing a sample $P_{sample}$ of a fluorescent and/or fluorescence-labeled analyte for which a value $c_{sample}$ of concentration C is to be determined;
  performing a fluorescence measurement for the sample $P_{sample}$ and determining the value $i_{sample}$ of a concentration-dependent parameter I from the fluorescence measurement;
  determining the value $m_{sample}$ of a diffusion measure M which influences and/or characterizes the diffusion of the analyte occurring during the fluorescence measurement; and
  determining the value $a_{sample}$ of the slope parameter a specific to the analyte on the basis of the function $E(m)=a$ using the value $m_{sample}$ of the diffusion measure M specific to the analyte, establishing a function $F_{sample}(c)=i$ whose derivative at $c=0$ gives the value $a_{sample}$ by adequate fitting to the functions $F_j(c)=i$, and determining the concentration $c_{sample}$ of the sample $P_{sample}$ from the function $F_{sample}(c)=i$ for the value $a_{sample}$ and from the value $i_{sample}$ as determined from the fluorescence measurement for the sample $P_{sample}$, by forming the inverse function $F^{-1}_{sample}(c)$ or by a suitable approximation technique.

10. A method for determining the concentration of a sample $P_{sample}$ of a fluorescent and/or fluorescence-labeled analyte using the function $E(m)=a$ that can be determined by a calibration method according to claim 1 and using the functions $F_j(c)=i$ for the values $a_j$ of slope parameter a, comprising the steps of:
  providing a sample $P_{sample}$ of a fluorescent and/or fluorescence-labeled analyte for which a value $c_{sample}$ of concentration C is to be determined;
  performing a fluorescence measurement for the sample $P_{sample}$ and determining the value $i_{sample}$ of a concentration-dependent parameter I from the fluorescence measurement;
  determining the value $m_{sample}$ of a diffusion measure M which influences and/or characterizes the diffusion of the analyte occurring during the fluorescence measurement; and
  determining the value $a_{sample}$ of the slope parameter a specific to the analyte on the basis of the function $E(m)=a$ using the value $m_{sample}$ of the diffusion measure M specific to the analyte, establishing a function $F_{sample}(c)=i$ whose derivative at $c=0$ gives the value $a_{sample}$ by adequate fitting to the functions $F_j(c)=i$, and determining the concentration $c_{sample}$ of the sample $P_{sample}$ from the function $F_{sample}(c)=i$ for the value $a_{sample}$ and from the value $i_{sample}$ as determined from the fluorescence measurement for the sample $P_{sample}$, by forming the inverse function $F^{-1}_{sample}(c)$ or by a suitable approximation technique.

11. The method as claimed in claim 1, wherein the values i of the concentration-dependent parameter I are determined from fluorescence measurements using a fluorimeter, wherein the concentration-dependent parameter I is fluorescence intensity.

12. The method as claimed in claim 1, wherein the values i of the concentration-dependent parameter I are determined from fluorescence measurements using a technique based on fluorescence microscopy, in particular confocal fluorescence microscopy or multi-photon fluorescence microscopy, wherein the concentration-dependent parameter I is one of mean fluorescence intensity, mean particle count in an observation volume, and reciprocal of the coefficient of fluorescence intensity variance.

13. The method as claimed in claim 1, wherein the analyte and the reference analytes $R_j$ comprise macromolecules, in particular polymers, preferably polynucleotides and/or oligonucleotides and/or proteins.

14. The method as claimed in claim 1, wherein the analyte and the reference analytes $R_j$ comprise double-stranded polynucleotide fragments, wherein the respective reference analytes $R_j$ are each distinguished by a predetermined mean fragment length or number of base pairs in the polynucleotide fragments and differ from each other by said mean fragment length.

15. The method as claimed in claim 1, wherein the fluorescent and/or fluorescence-labeled analyte and the fluorescent and/or fluorescence-labeled reference analytes include the same fluorophores or fluorophores with the same quantum yield.

16. The method as claimed in claim 1, wherein the fluorescence-labeled analyte and the fluorescence-labeled reference analytes are labeled with a fluorescent dye which preferably labels in a sequence-independent manner.

17. The method as claimed in claim 1, wherein the diffusion measure M used is diffusion time $\tau_D$, diffusion coefficient D, or mean particle size.

18. The method as claimed in claim 1, wherein the values m of the diffusion measure M for the analyte or the reference analytes are determined by correlation spectroscopy.

19. The method as claimed in claim 1, wherein the values m of the diffusion measure M for the analyte or the reference analytes are determined by a fluorescence-based technique, in particular by a technique based on fluorescence microscopy, preferably confocal fluorescence microscopy or multiphoton fluorescence microscopy.

20. The method as claimed in claim 1, wherein the values m of the diffusion measure M for the respective analyte or reference analyte are determined by fluorescence correlation spectroscopy (FCS), in particular by autocorrelation.

21. The method as claimed in claim 1, wherein the values m of the diffusion measure M for the analyte and/or the reference analytes are determined by techniques, in particular separation techniques, based on the particle size and/or particle shape of the analyte or the reference analyte.

22. The method as claimed in claim 17, wherein the dependence of the values $d_j$ of the diffusion coefficient D of a number of reference analytes $R_j$ having different mean fragment lengths $bp_j$ on the mean fragment lengths bp is established by a function f(bp)=d that is obtained by fitting to the value pairs ($d_j$, $bp_j$), wherein the function f(bp)=d can be used to determine the value $d_{sample}$ for an analyte that comprises double-stranded polynucleotide fragments with a known mean fragment length.

23. The method as claimed in claim 1, wherein the sample $P_{sample}$ and $P_{j,v}$ contain a solution of the analyte or reference analyte in a dilution medium.

24. A kit for determining the concentration of fluorescent and/or fluorescence-labeled analytes using the method as claimed in claim 1, wherein the kit comprises a plurality of fluorescent and/or fluorescence-labeled reference analytes and/or reference analytes that can be fluorescence labeled, which differ from each other by values m of a diffusion measure M.

* * * * *